(12) United States Patent  
Bonet et al.

(10) Patent No.: US 8,686,272 B2  
(45) Date of Patent: Apr. 1, 2014

(54) METHOD AND SYSTEM FOR MUSIC RECOMMENDATION BASED ON IMMUNOLOGY

(75) Inventors: Antonio Trias Bonet, Sant Cugat del Valles (ES); Jesùs Sanz Marcos, Barcelona (ES)

(73) Assignee: Polyphonic Human Media Interface, S.L., Barcelona (ES)

( * ) Notice: Subject to any disclaimer, the term of this patent is extended or adjusted under 35 U.S.C. 154(b) by 94 days.

(21) Appl. No.: 13/076,419

(22) Filed: Mar. 30, 2011

(65) Prior Publication Data

US 2012/0078824 A1    Mar. 29, 2012

Related U.S. Application Data

(63) Continuation-in-part of application No. 11/825,457, filed on Jul. 6, 2007, now Pat. No. 8,053,659, which is a continuation-in-part of application No. 11/492,395, filed on Jul. 25, 2006, now abandoned, which is a continuation of application No. 10/678,505, filed on Oct. 3, 2003, now Pat. No. 7,081,579.

(60) Provisional application No. 60/415,868, filed on Oct. 3, 2002, provisional application No. 61/318,829, filed on Mar. 30, 2010.

(51) Int. Cl.  
*G10H 7/10* (2006.01)

(52) U.S. Cl.  
USPC .............................................. 84/608; 700/94

(58) Field of Classification Search  
USPC ................... 84/608, 615, 634; 700/94; 707/1; 705/10; 713/176; 708/403  
See application file for complete search history.

(56) References Cited

U.S. PATENT DOCUMENTS

| | | | |
|---|---|---|---|
| 7,081,579 B2 * | 7/2006 | Alcalde et al. | 84/608 |
| 7,958,130 B2 * | 6/2011 | Manolescu | 707/749 |
| 7,987,148 B2 * | 7/2011 | Hangartner et al. | 706/46 |
| 2004/0107821 A1 * | 6/2004 | Alcalde et al. | 84/608 |
| 2009/0049091 A1 * | 2/2009 | Slaney et al. | 707/104.1 |
| 2010/0076958 A1 * | 3/2010 | Gates et al. | 707/722 |
| 2010/0325135 A1 * | 12/2010 | Chen et al. | 707/759 |

* cited by examiner

*Primary Examiner* — Jeffrey Donels  
(74) *Attorney, Agent, or Firm* — Gibb & Riley, LLC

(57) ABSTRACT

An artificial intelligence song/music recommendation system and method is provided that allows music shoppers to discover new music. The system and method accomplish these tasks by analyzing a database of music in order to identify key similarities between different pieces of music, and then recommends pieces of music to a user depending upon their music preferences. Once the song files have been analyzed and mapped, this system uses four layers, metaphorically equivalent to the human immune system, to provide music recommendation.

16 Claims, 15 Drawing Sheets

METHOD AND SYSTEM FOR MUSIC RECOMMENDATION BASED ON IMMUNOLOGY

CROSS REFERENCE TO RELATED APPLICATIONS

This application is a continuation-in-part of and co-owned U.S. patent application Ser. No. 11/825,457, filed with the U.S. Patent and Trademark Office on Jul. 6, 2007 now U.S. Pat. No. 8,053,659 entitled "Music Intelligence Universe Server", which is a continuation-in-part of and co-owned U.S. patent application Ser. No. 11/492,395, filed with the U.S. Patent and Trademark Office on Jul. 25, 2006 now abandoned entitled "Method and System for Music Recommendation", which is a continuation of and co-owned U.S. patent application Ser. No. 10/678,505, filed with the U.S. Patent and Trademark Office on Oct. 3, 2003 entitled "Method and System for Music Recommendation", now U.S. Pat. No. 7,081,579, which is based upon and claims benefit of and co-owned U.S. Provisional Patent Application Ser. No. 60/415,868 entitled "Method and System for Music Recommendation", filed with the U.S. Patent and Trademark Office on Oct. 3, 2002 by the inventors herein, the specifications of which are incorporated herein by reference.

This application also claims benefit of and co-owned U.S. Provisional Patent Application Ser. No. 61/318,829 entitled "Method and System for Music Recommendation Based on Immunology", filed with the U.S. Patent and Trademark Office on Mar. 30, 2010 by the inventors herein, the specification of which is incorporated herein by reference.

BACKGROUND OF THE INVENTION

1. Field of the Invention

The invention disclosed herein relates generally to methods and systems for analyzing and using digital music compositions, and more particularly to a method and system for determining the characteristics of a musical composition by analyzing its digital composition, and uses multiple layers to recommend particular musical compositions to users.

2. Description of Related Art

Historically, what is pleasing to the human ear has not changed since man began making sounds. Patterns in music that are pleasing to the human ear have not changed much, if at all, since the times of the classical composers. What has changed are styles, performances, the instruments used, and the way music is produced and recorded; but a compelling melody is still compelling, and a series of random notes still sounds random. For example, the dictionary describes melody as a series of notes strung together in a meaningful sequence. Unfortunately, some sequences sound meaningful and make up a beautiful song, and other sequences just sound like noise.

While the number of possible melody patterns combined with all of the other variables in recorded music allow for a seemingly infinite number of combinations, the patterns that we find pleasing have not changed. That is not to say everything has been invented, however. So far, every new style of music that has come into being: country, rock, punk, grunge, etc. have all had similar mathematical patterns. The hits in those genres have all come from the same 'hit' clusters that exist today, and anything that has fallen outside of such 'hit' clusters has rarely been successfully on the charts for its musical qualities.

Artificial immunology is concerned with abstracting the structure and function of the immune system to computational systems, and investigating the application of an artificial immunology system towards solving computational problems. Artificial Immune Systems are adaptive systems, inspired by theoretical immunology and observed immune functions, principles and models, which are applied to problem solving. There are many ways to apply artificial immunology to engineering and computer science. One method is negative selection, which refers to the identification and deletion of false positive results. This class of algorithms is typically used for classification and pattern recognition problem domains. For example in the case of an anomaly detection domain the algorithm prepares a set of exemplar pattern detectors trained on normal (non-anomalous) patterns that model and detect unseen or anomalous patterns.

SUMMARY

It is an object of the present invention to provide a method and system for measuring the characteristics of a musical composition, and establishing a collection of digital musical compositions that may be sorted based upon such characteristics.

It is another object of the present invention to provide a method and system for determining a preferred musical characteristic profile for a music listener.

It is another object of the present invention to enable a method and system to compare digital music files to discover mathematically similar songs.

The system uses a series of complex artificial intelligence algorithms to analyze a plurality of sonic characteristics in a musical composition, and is then able to sort any collection of digital music based on any combination of similar characteristics. The characteristics analyzed are those that produce the strongest reaction in terms of human perception, such as melody, tempo, rhythm, and range, and how these characteristics change over time.

A set of artificial Immune System modules improve the prior methods and results mentioned, by detecting "wrong similarity" sounds as "intruders" of the system in an environment of proper sounds that define the "objective self". The analysis uses very short time signals as the analogue of protein epitopes in life systems. That is, in determining similarity between musical compositions, the system identifies and limits false positive results.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF PREFERRED EMBODIMENTS

The invention summarized above and defined by the enumerated claims may be better understood by referring to the following description, which should be read in conjunction with the accompanying drawings in which like reference numbers are used for like parts. This description of an embodiment, set out below to enable one to practice an implementation of the invention, is not intended to limit the preferred embodiment, but to serve as a particular example thereof. In addition, it is to be understood that the phraseology and terminology employed herein are for the purpose of description and should not be regarded as limiting. The invention is capable of other embodiments and of being practiced and carried out in various ways. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
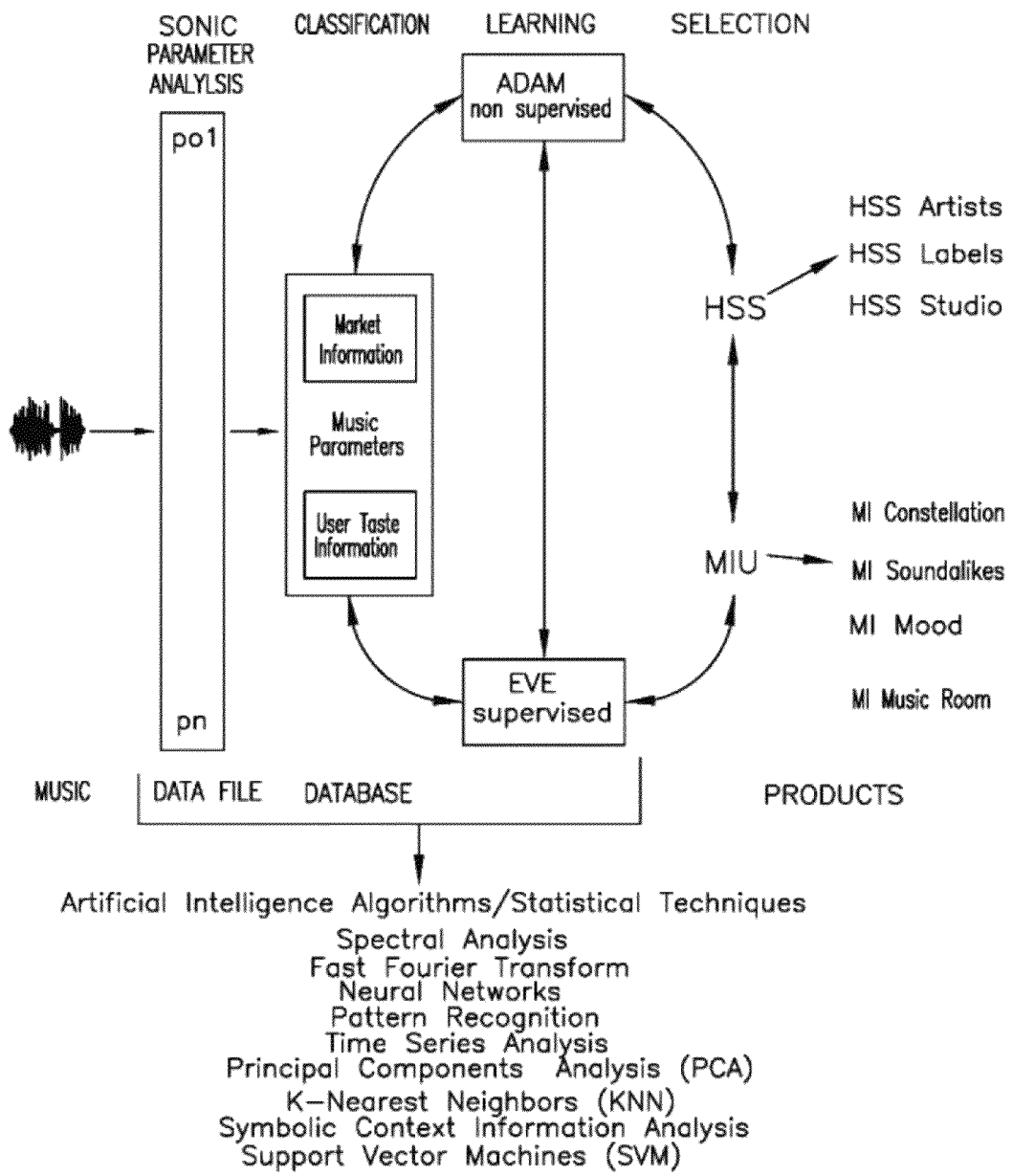
FIG. 1 is a schematic overview of a system according to the present invention.

Referring to FIG. 1, the method and system of the instant invention enable the analysis and processing of digital music in order to establish a description of a number of characteristics of the music, and likewise enable recommending a collection of music having particular characteristics to a user who has established a desired musical characteristic profile.

The raw materials for the system are music and songs. The songs are stored in a digital file, which is the main starting point for all embodiments. The first step performed by the system is to analyze an existing digital music file in order to create a descriptive profile for the musical characteristics of the song. The music analysis mimics human hearing and perception. In a first stage, the analysis portion reads a song file and extracts some data. This data can be represented as a series of numbers, which are the main input for future processing. Such processing depends on the final application, and can use algorithms such as Principal Component Analysis (PCA), KNearest Neighbors (kNN), etc.

The processes, according to the present invention, start by analyzing a large and representative sample of music. The process analyzes more than 60 characteristics of the music, such as brightness and tempo, and measures how the characteristics change over time. The selected characteristics have been identified in user testing to produce the strongest reaction. Often the characteristics are perceived unconsciously by the listener, and the correct mix of parameters is more important than any individual parameter by itself. Parameter analysis is described in U.S. Pat. No. 7,081,579 to Alcalde et al., the specification of which is included herein by reference, in its entirety.

In a preferred embodiment, the processes described herein measure innovation/prediction cycles in musical structure by using spectrum variables for power law detection. They also measure deviation analysis from the universality trend through detection of cycles from the universality trend and the detection of innovation.

Following analysis of the sonic parameters, software modules according to a preferred embodiment of the present invention learn a user's musical preferences. The software uses two modules: one called ADAM, a cluster recognition engine, and another called EVE, a music recommendation engine.

ADAM is a conceptual clustering engine that is based on physical pattern recognition models. This non-supervised learning system generates a hierarchical tree structure that is based on topological metrics, recognizing connected components (that is, it can detect "holes" in the space and clusters), which automatically determines the final number of clusters while allowing for automated related variable detection. The methodology for detecting social trends is completely scalable, and has been successfully applied in many other areas. It is also used for the preliminary visualization engine described in more detail below.

EVE is a non-linear kernel learner, which had been successfully used in many other commercial applications. This supervised learning system uses technology that has been proven to outperform statistical and neural network systems. A mathematically elegant solution that is relatively easy to customize and refine, the algorithm uses a direct strategy to capture personal Von Neumann Morgenstern utility functions. Due to their elegant and parsimonious mathematical architecture, both ADAM and EVE have been easily ported to new operating system environments.

After the system has learned a user's musical preferences, it can connect the user with music selections based on his or her likes and dislikes.

Figure 2:
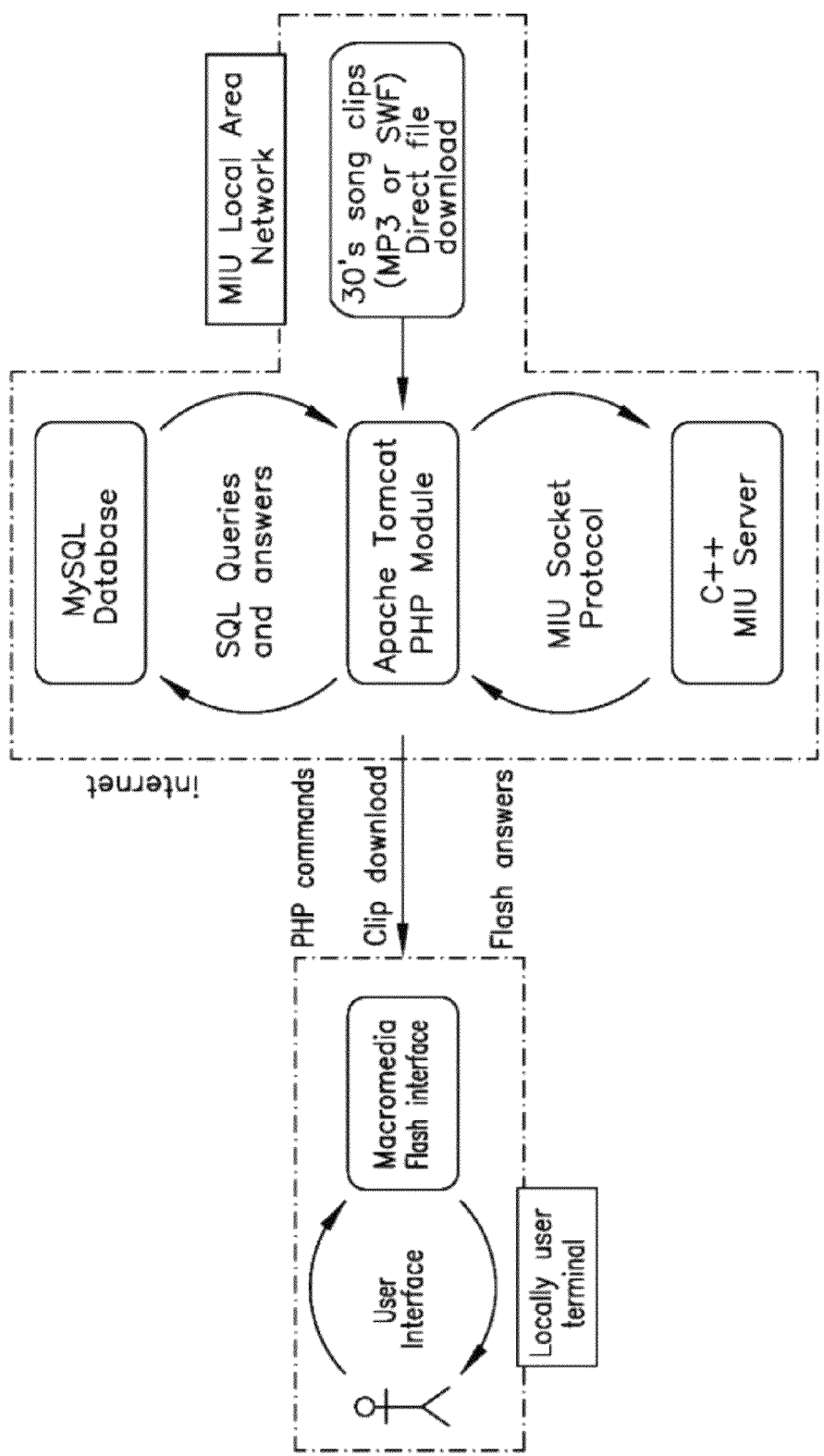
FIG. 2 is a schematic of the global system architecture of the present invention.

FIG. 2 shows the server architecture that has been developed to interact with a user though an active web page. The user interacts locally with a user visual interface. In a preferred embodiment, the visual interface may be run locally on the user terminal and communicate with the Music Intelligence Universe (MIU) Environment. The MIU environment comprises several modules:

The music database module consists of a database server that stores metadata information for songs (artists, genre, year, 30-second clip location, etc).

The music clip storage module stores 30-second clips of all the songs that are in the database so the visual interface can download them.

The MIU server module makes all the computations necessary to provide the services. In a preferred embodiment, the server module comprises an ANSI C++ portable application that communicates via sockets.

The Web server module manages all the communications with the rest of the modules and with the user visual interface. In a preferred embodiment, the web server module may be an active web page.

The starting point of the Music Intelligence Universe is the ability to extract quantitative information from a song stored in digital format. The different types of mathematical procedures used to extract song descriptor are described in detail in U.S. Pat. No. 7,081,579. The analysis module is designed to be extremely portable and self-constituent, which means that it contains all the information it requires. Accordingly, the input of the MIU server is a list of songs with their respective descriptors (set of real numbers that could define different type of signal analysis, for example, the mean frequency, the level of noise, the mean power, tempo, rhythm, beat, etc). A unique identifier is assigned to each song, which is used to retrieve metadata from the database, such as artist name, song title, 30-second clip, etc.

Sometimes it is useful to apply a technique called Eigen Value Decomposition to find a reduced set of useful descriptors such as based on Principle Component Analysis (PCA) condensing the information because descriptors are not totally independent. So as to be able to filter the recommended song list, some auxiliary non-mathematical information is also sent to the server (such as, the year and the genre of the song). All this information is stored in an ASCII file that the MIU Server can read, parse, and analyze. The format of the MIU Server input ASCII file may be as follows:
id; 0; 1; 1; YEAR; GENRE; PCA1; PCA2; PCA3; VAR1; VAR2; VAR3; VAR4; VAR5 . . . .
where PCA_refers to specific parameter values and VAR_refers to the song descriptors.

According to the present invention, a song file is constructed using a "seed" song as a service input parameter, and the PCAs or the descriptors of the song are retrieved and stored.

$$\text{seed song } S_s = (s_0, s_1, s_2, \ldots, s_{N-1})$$

The Euclidean distance is evaluated with the rest of the songs in the database. In some embodiments, filters can be activated, such as a genre filter. A list of a specified length is selected containing songs with minimum distance from the seed song.

$$\text{filtered song } S_f = (d_0, d_1, d_2, \ldots, d_{N-1})$$

$$\text{euclidean distance } d = \sqrt{\sum_{n=0}^{N-1} (s_n - d_n)^2}$$

The PHP module has the possibility to select whether to use the PCAs or the descriptors. With PCAs, the calculations are done faster, but with the descriptors, it will be possible to also send weights to disable some descriptors and find, for example, songs with similar rhythm but with different tempo.

The encoding transforms the input ASCII file that contains song identifiers, genre, PCAs, and descriptors into three binary files designed to improve MIU performance. These three files are:

Songs file (usually DBNAME.songs.miuserver.bin): contains song information (id, genre, year, PCAs, and descriptors) that is ciphered to complicate song descriptor retrieval. It is a simple way to protect descriptor information so binary files can be stored in client servers without jeopardizing the analysis.

Learning files (usually DBNAMEdearning.miuserver.bin): contains the learning described below.

Clusters files (usually DBNAME.clusters.miuserver.bin): Data clustering is a common technique for statistical data analysis, which is used in many fields, including machine learning, data mining, pattern recognition, image analysis, and bioinformatics. Clustering is the classification of similar objects into different groups, or more precisely, the partitioning of a data set into subsets (clusters), so that the data in each subset (ideally) share some common trait—often proximity according to some defined distance measure. Machine learning typically regards data clustering as a form of unsupervised learning. This file stores information about the clusterization performed with the ADAM technology that can be used to refine music recommendation.

The rationale under the EVE learning technology applied to the music is to consider that human music taste has a linear behavior with some sound descriptors. To understand the invention we will describe an example with only two descriptors: rhythm and tempo. Songs are analyzed, and a vector containing song tempo and song rhythm is created for each song:

$$\text{song\#}i \vec{s}_i = (\text{tempo}_i, \text{rhythm}_i) = (x_i, y_i)$$

Both the tempo and the rhythm are normalized in the interval [0, 1] and are projected into a bidimensional space. In this example, user taste is also a vector with two variables. Using EVE technology on the taste vector, the songs can be graded using the dot product:

$$\text{user taste } \vec{w} = (w_0, w_1)$$

$$\text{user song grade } m = \vec{s}_i \vec{w} = (x_i, y_i)(w_0, w_1) = x_i w_0 + y_i w_1$$

Classical EVE is able to extract user taste $\vec{w}$ by asking the user several questions. These questions consist of presenting to the user pairs of songs and asking the user to select the preferred one between the pairs of songs. Each answer refines the estimated user taste $\vec{w}_e$.

There is one requirement, however, that cannot be fulfilled in classical EVE for music taste tester. Classical EVE imposes that songs vectors must be normalized:

$$|\vec{s}_i| = \sqrt{x_i^2 + y_i^2} = 1$$

As an example of how EVE works, the song database can be reduced to contain only the songs that follow this condition. First, the bidimensional song universe is depicted together with the songs that are inside the normalization region. This condition states that a music estimation vector can only be used to compare between songs that have the same norm, which one could say is useless.

Figure 3:
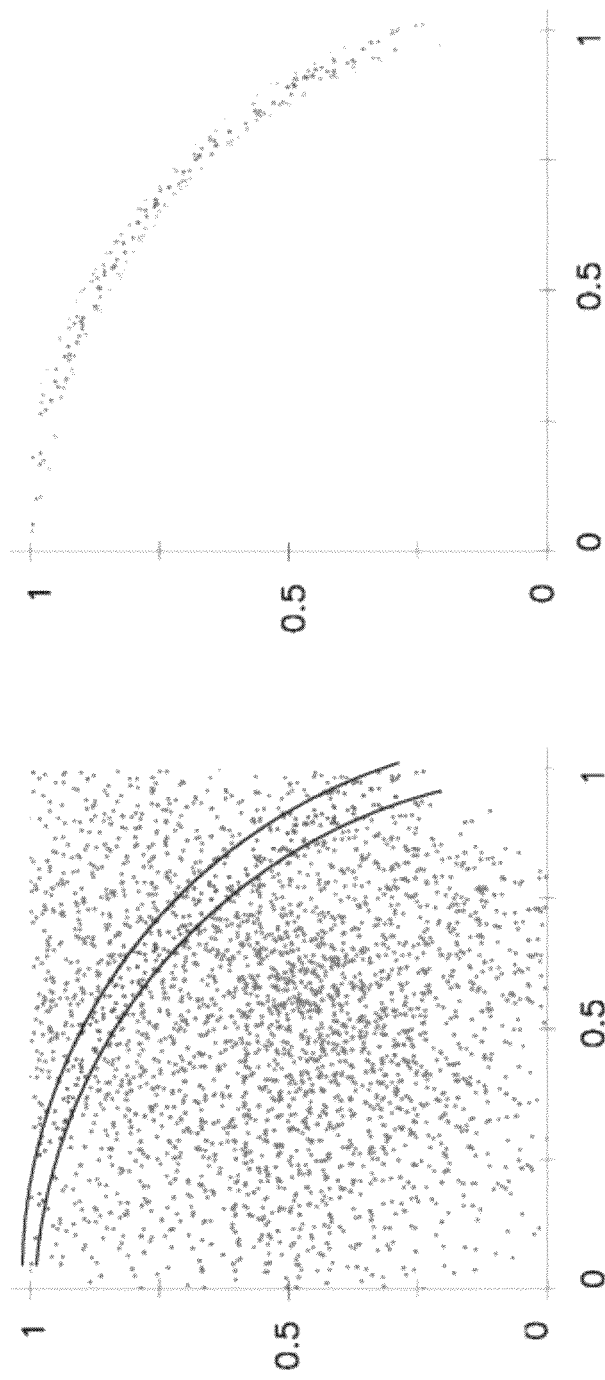
FIG. 3 shows a filtered and unfiltered image of the music universe in an example of the present invention.
Figure 4:
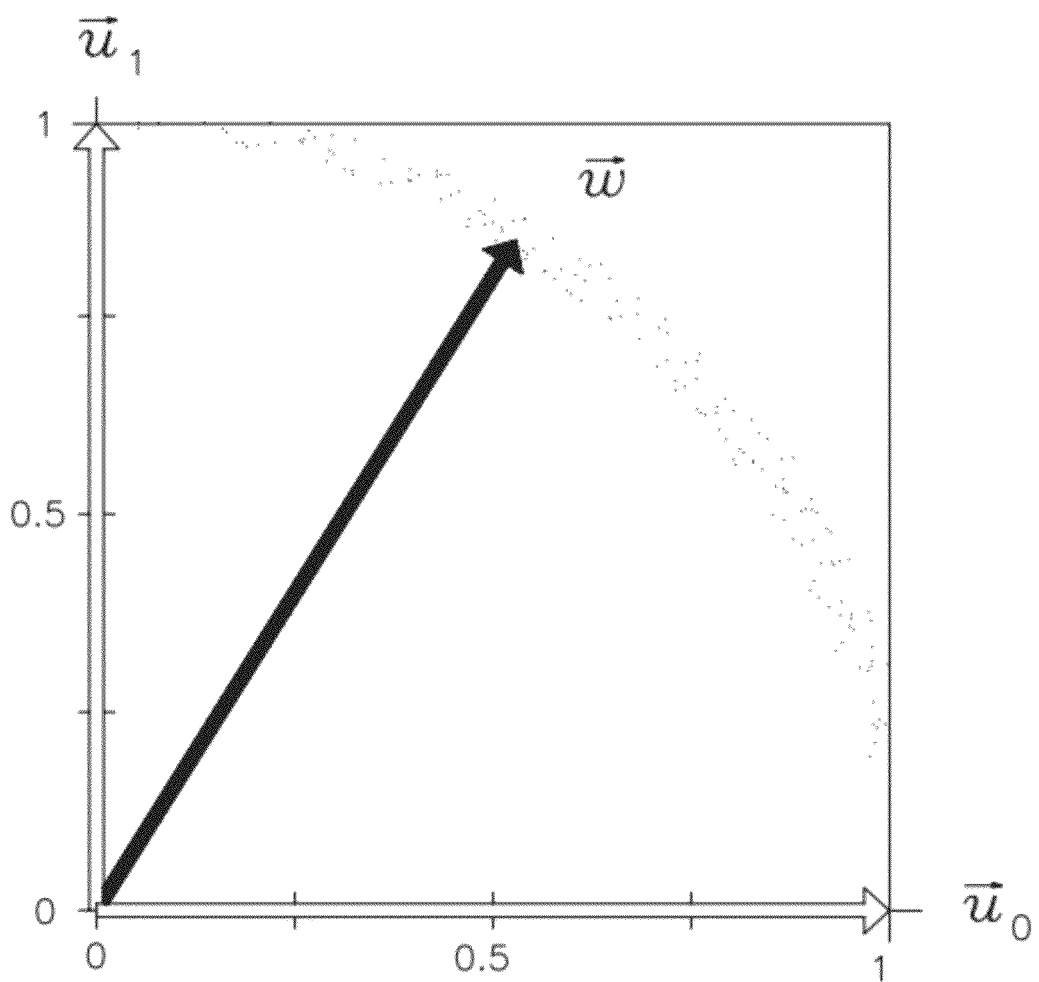
FIG. 4 shows a taste vector in the filtered music universe of FIG. 3.
Figure 5:
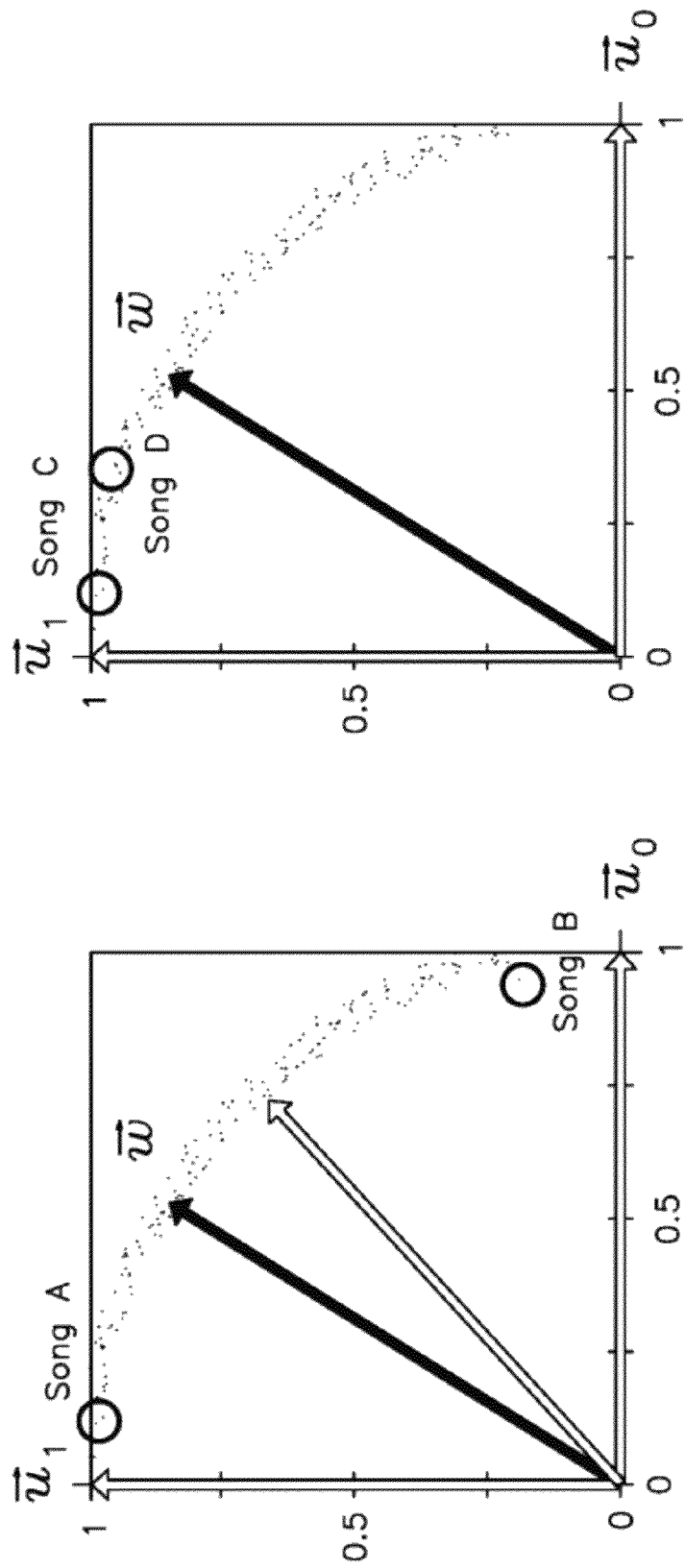
FIG. 5 shows alternate song pair selections in the filtered music universe of FIG. 3.

FIG. 3 shows the original music universe with tempo and rhythm descriptors of the presented example on the left and the filtered universe on the right with only the songs vectors that have norm equal to one. As classic EVE asks questions to the user, the region reduces in size and finally the user taste vector is estimated to be within the final region, with some uncertainty. To start, this region contains the filtered universe as seen in FIG. 4. The estimated taste vector is determined by the mean of two vectors that define a part of the universe. In this example, we have selected a random user music taste vector $\vec{w}$ that has to be estimated. The most sensitive point in this process is to find a pair of questions that improves learning. To improve learning means that the universe region converges to the estimated taste faster and more accurately. FIG. 5 shows an example of the best possible first pair of questions to show the user (Song A & Song B) and a worse song pair (Song C & Song D). In theory, the best pair, Song A and Song B, makes it easier for the user to select the preferred song because both songs in the pair are more different, more distinguishable. Songs C and D are not dissimilar enough to discern a preferred characteristic.

In FIG. 5, the user—with the linear assumption always present—should have to prefer song A rather song B because the grade of song A is higher than the grade of song B for a given $\vec{w}$. It can also be seen from a geometry point of view because the dot product gives the cosine of the angle between vectors and the angle between song A and $\vec{w}$ is smaller than the angle between song B and $\vec{w}$.

$$\vec{s}_A \vec{w} > \vec{s}_B \vec{w}$$

Figure 6:
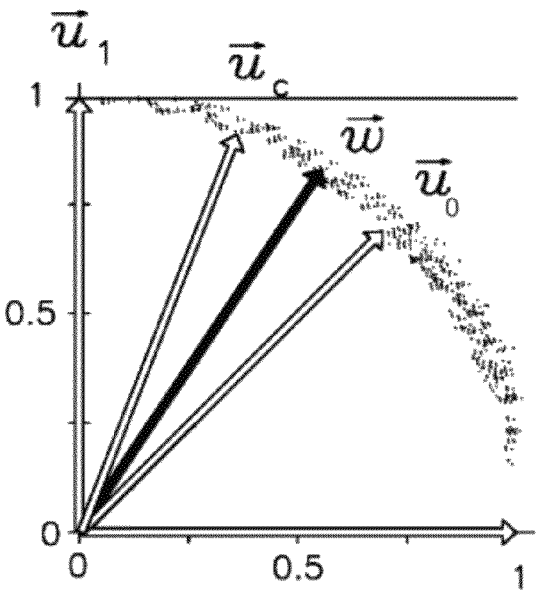
FIG. 6 shows a narrowed music universe after a first song selection.

The next step is to divide the Music Universe considering the answer sent by the user. This is visible in the FIG. 6, which shows an updated Music Universe region as a consequence of user song selection. Please note that the mean region vector has also been updated.

Figure 7:
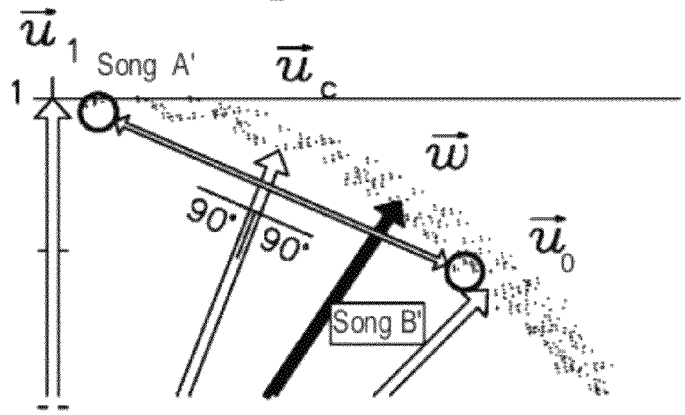
FIG. 7 shows a further narrowed music universe after a second song selection.

Referring to FIG. 7, in the next level of the learning algorithm, the region has changed, and a new vector has been introduced, $\vec{u}_c$, which is defined as the normalized sum of the region vectors $\vec{u}_0$ and $\vec{u}_1$. If the learning process stopped here, the estimated taste vector would be $\vec{u}_c$. However, if the algorithm continues, the classic EVE approach finds a second question that maximizes the probability to learn something from the answer given to the question. To find the second question, another pair of songs is searched that combines high distance between them and orthogonality with the new region center, shown as song A' and song B'.

Figure 8:
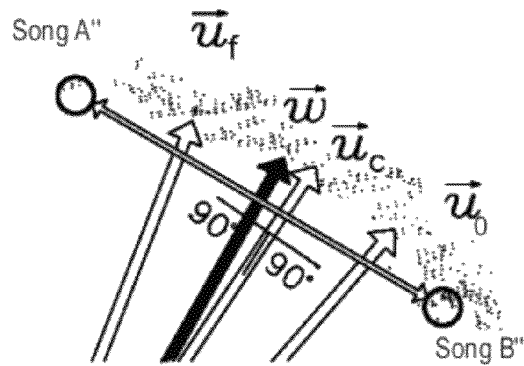
FIG. 8 shows a still further narrowed music universe after a third song selection.

Again, if user taste is consistent as well as the linear taste assumption, the user should have to select song B' in this second question as the angle between $\vec{w}$ and song B' vector is smaller than with song A'. The complexity of the method resides in selecting a good question between all the possible pairs of songs. The best possible pairs are always the same, but, to give the server a more diverse and natural behavior, the server avoids repeated questions between consecutive learning services. (That is, each time a pair of songs is used, they are added to a list so as not to be used again in the current training session.) Following again our simple two-variable example, the region is updated again, and a new pair of songs (song A″ and song B″) is presented to the user, as shown in FIG. 8.

The music taste estimation vector (given by the normalized region average) gets closer to the user taste vector as the algorithm goes forward. At the end, depending on the number of questions asked to the user, the error in vector taste estimation will decrease, but there is always a degree of uncertainty. In theory, questions should be more difficult to answer for the user as the process goes along, but this depends on the user's taste.

Finally, to obtain a list of recommended songs, classic EVE evaluates all the songs with the music taste estimated vector, and sorts them decreasingly by grade.

As described above, classical EVE has some limitations that arise from its linear learning capability, and, because it was designed to be able to generate ideal questions while in the music framework, the number of songs is limited and a compromise has to be selected because not all ideal questions (pairs of songs) exist. The main limitation, however, of classic EVE is that input songs must be normalized. That means that instead of having two descriptors, by normalizing we obtain a single descriptor that is related to the ratio between them and it is not possible to go back. In the real world, this would mean that two songs one with small values of tempo and rhythm, and the other with high values of tempo and rhythm would be considered by the system as being very similar. In the same way, the estimated vector cannot isolate between rhythm and tempo as the estimated vector is again a relation between them. It is not possible to differentiate between the following two music tastes:

"I like high tempo and high rhythm"
"I like low tempo and low rhythm"

This is solved by using a technique called Kernelization derived from the Support Vector Machines. It can be viewed as keeping a linear learning method like Eva, but instead of using the original space (in our case, bidimensional for tempo and rhythm), using an extended space usually with more dimensions. This allows EVE to learn non-linear music taste vectors. The drawback of adding more dimensions, of course, is the increase of the uncertainty in the estimated taste.

$$(s_x, s_y) \xrightarrow{\text{KERNEL}} (k_x, k_y, k_z)$$

Figure 9:
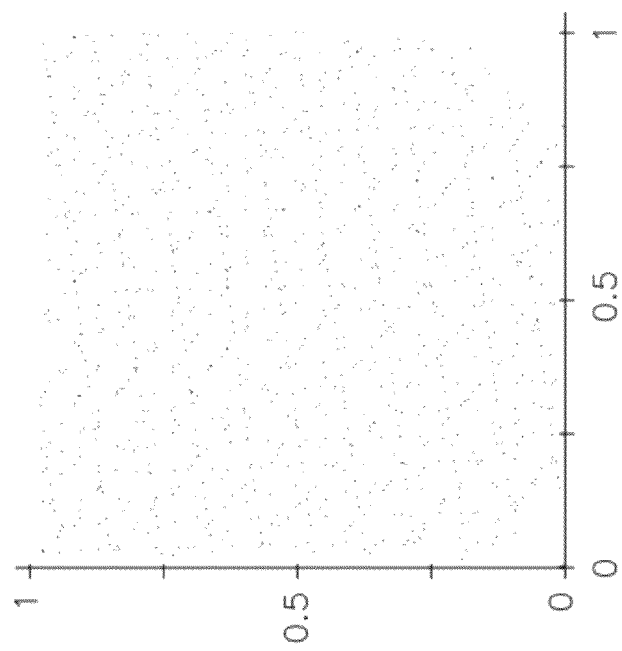
FIG. 9 illustrates a visual transformation from a two-dimensional to a three-dimensional music universe according to the present invention.
Figure 9:
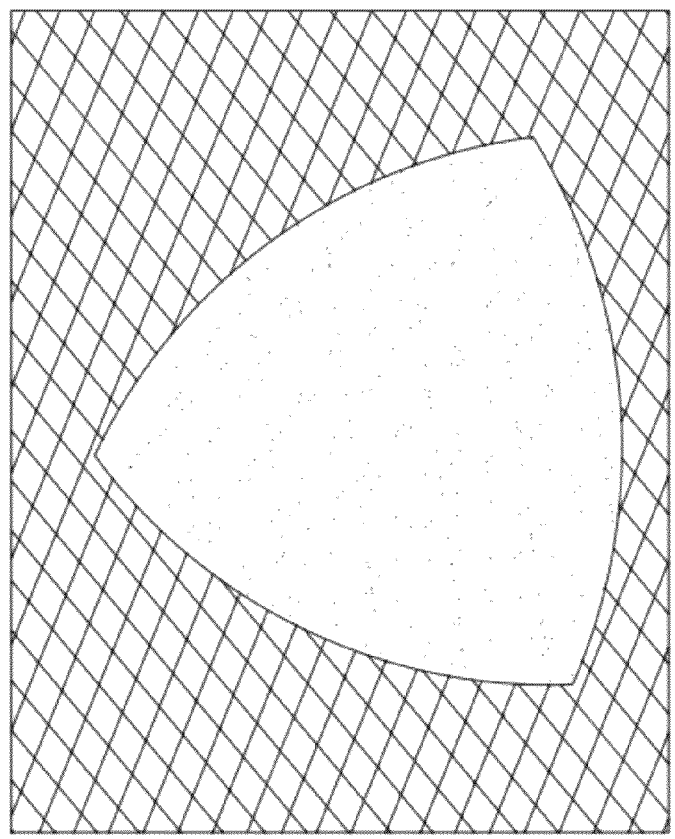

It is based on a transformation from two input variables [0, 1]×[0, 1] to three variables. The output 3D vector is normalized using a cylindrical transformation. From a graphical point of view, the kernel maps a 2D quadrant into the surface of a quadrant of a sphere. This is depicted in FIG. 9.

The first step of the kernelization adds a margin to the data in order to avoid null border values in order to maintain nulls out of the transformation chain.

$$g_x = 0.005 + 0.99 s_x$$

$$g_y = 0.005 + 0.99 s_y$$

In classic EVE, only the angle between the two variables was significant. In the current algorithm, the non-linearity comes from also using the module of the vector. This makes it possible to learn in which part of the Music Universe the user taste resides.

$$r = \sqrt{g_x^2 g_y^2}, r > 1 \rightarrow r = 1$$

$$\theta = a\tan 2(g_y, g_x)$$

The 2D to 3D transformation is performed mapping input variables into spherical coordinates:

$$k_r = 1$$
$$k_\theta = \frac{\pi}{2} r$$
$$k_\phi = \theta$$

The operational space for classic EVE is Cartesian and kernelized variables are finally obtained by the Spherical-to-Cartesian transformation:

$$k_x = k_r \cos k_\phi \sin k_\theta$$

$$k_y = k_r \cos k_\phi \sin k_\theta$$

$$k_z = k_r \cos k_\theta$$

In summary, the Kernelized Eva is a classic EVE that operates within a universe that has one more dimension. This makes possible to learn non-linear music tastes in a controlled manner as the convergence of classic EVE is assured because it is a linear algorithm. The estimated vector has, therefore, three dimensions. Accordingly, the recommendation of songs also must be performed in the kernelized universe. 3D classic EVE is somewhat more complicated because there is one more dimension, and the region update strategy is not so straightforward. Furthermore, in the selection of pairs of songs an extra degree of freedom has to be taken into consideration.

If the database consists of less than a thousand songs, then the total number of pair of songs would be given by the following expression:

$$N(N-1)/2$$

Figure 10:
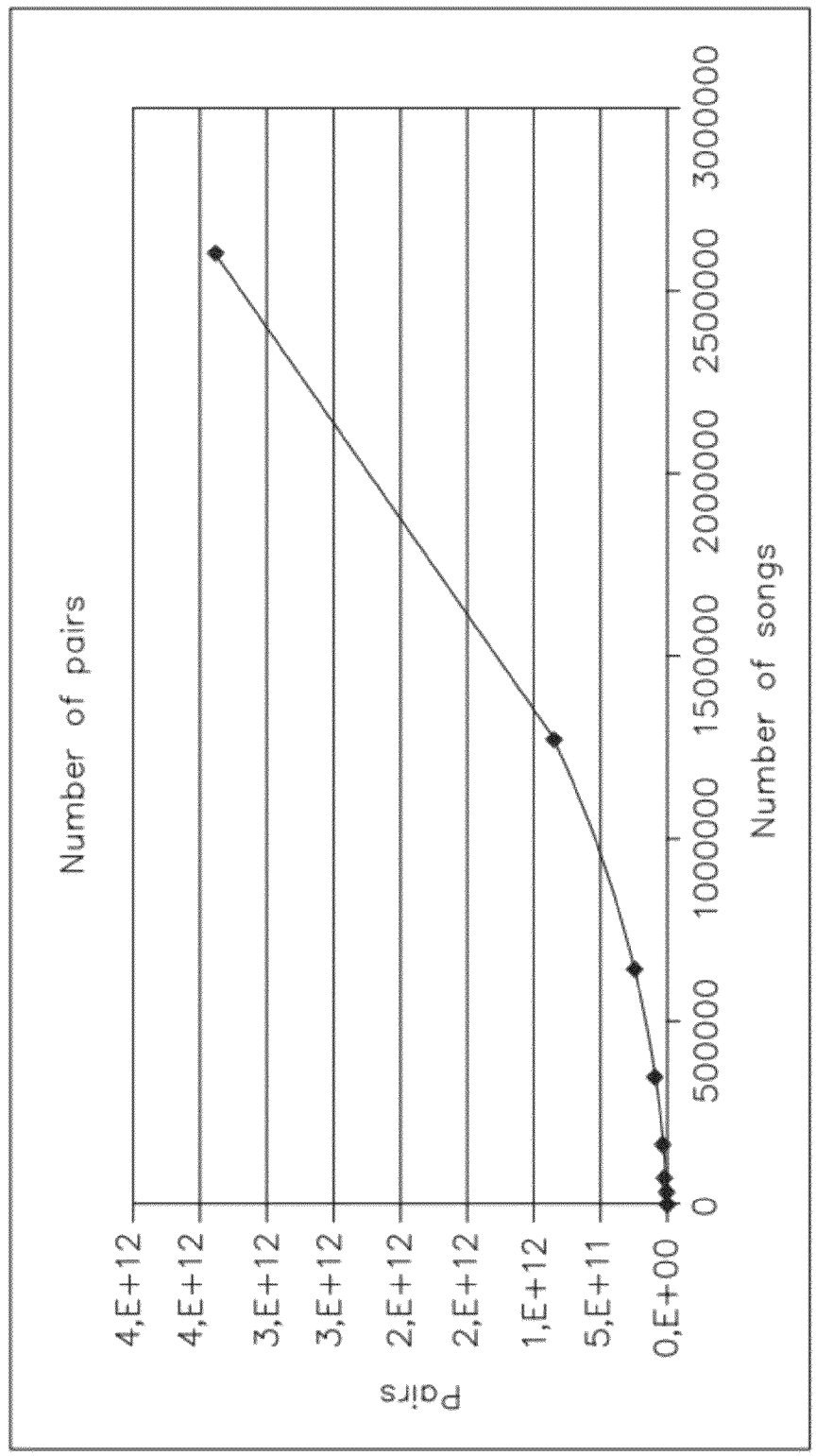
FIG. 10 illustrates the evolution of the number of song pairs to be analyzed according to the present invention.

With less than 1,000 songs, it is possible to compute all the possible pairs (0.5 M pairs), and select and store those more adequate for learning. The MIU Server, however, supports music databases on the order of tens of millions of songs. FIG. 10 shows the number of pairs to evaluate as a function of the total number of songs.

Looking to the rapidly growing function, it is clear that it is not possible to sweep all pairs to determine the preferable pair of songs for learning. This is the key of the music learning process, defining what a good question means. Intuitively, two songs very similar (with a small Euclidean distance in the Music Universe) cannot form a learning pair because it should be difficult for the user to select the preferred one. This is one of the three criteria: Euclidean distance has to be maximized in song pair selection for the learning process. The second criterion is obvious, but it has a significant impact in the design. Sometimes, a song has some properties (resides near the border of the music universe for example) that makes it very useful for music taste learning. However, it is very poor for a music interface point of view to repeat songs in consecutive questions so the algorithm needs to have memory. Finally, the last and most important idea: the pair that maximizes music taste learning convergence, besides the song distance, depends on the current state of the algorithm actual step; in other words, it depends on the answers given by the user to previous questions. To summarize these facts, the conditions for song pair selection are:

Maximum Euclidean distance between the songs to help the user selecting the preferred one.

Non-repeatability of songs during learning and from previous learning to promote diversity generation.

Maximum orthogonality to the current Music Universe region to help the learning algorithm converge.

With only a few thousands of songs, all the possible pairs can be evaluated to see if they accomplish all the previous criteria to be included in the learning song pair database. Nevertheless, with millions of songs, this is very inefficient. Let us remember that songs are kernelized from the bidimensional PCA universe to an extended universe with three variables. Songs are therefore projected into the first quadrant of a sphere. Every point has norm equal to one and therefore it can be referenced with two spherical coordinate angles (X and Y-axis on the Euclidean plane).

Figure 11:
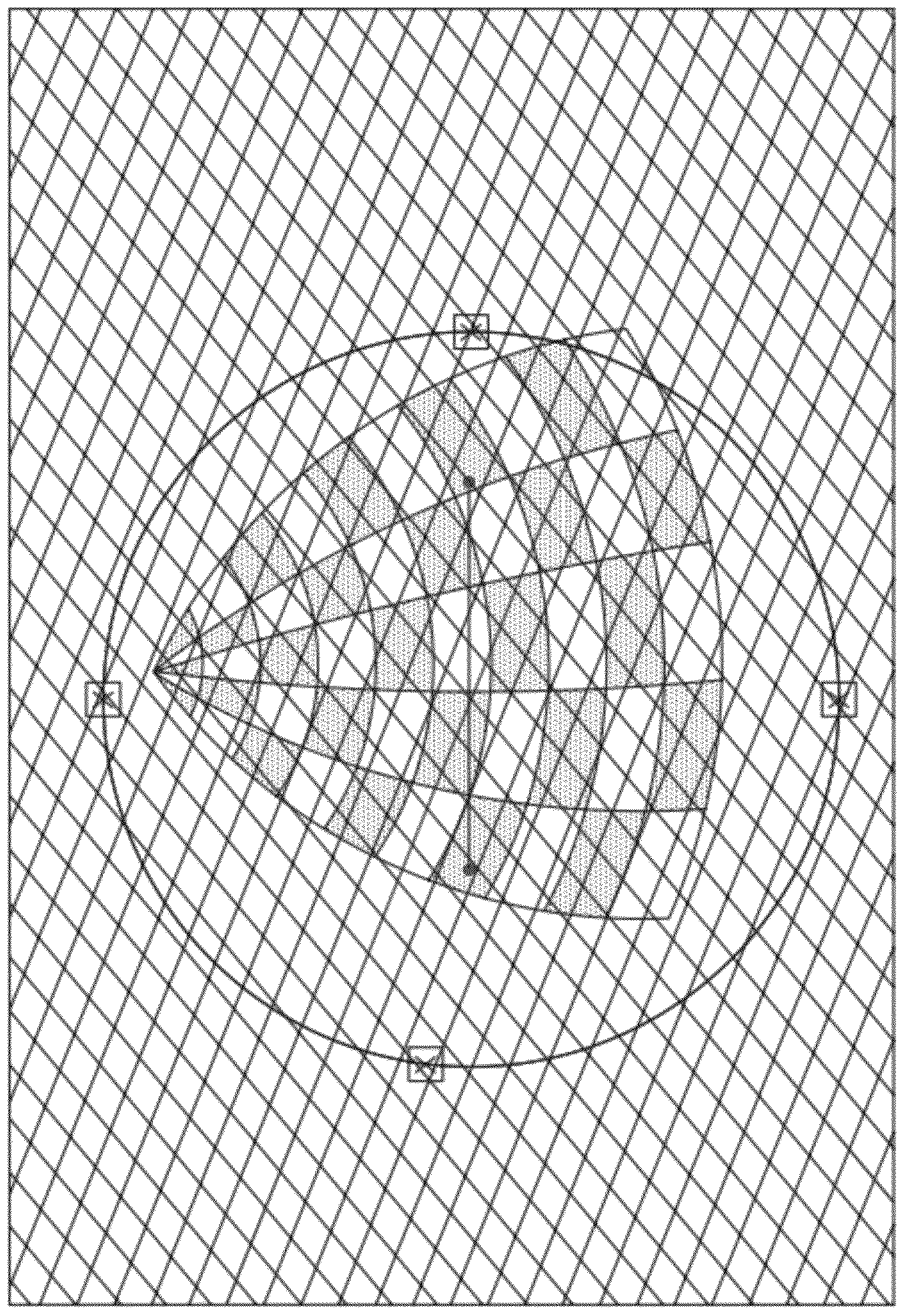
FIG. 11 illustrates a visual transformation from a two-dimensional to a three-dimensional music universe according to the present invention.

In a preferred embodiment, the approach followed in order to sweep all the possible pairs of songs is to divide and conquer. The sphere surface is divided with the use of meridians and parallels as seen in FIG. 11.

Instead of looking for the longest distances between the songs, the examination is done only between the crossing of the parallels and meridians and songs are grouped in these crossings. The surface is therefore divided in a grid and every song belongs to one cell of the grid. Only the longest cell distances are computed and the total number of possible pairs is reduced dramatically without losing any high distance pair.

To increase performance dramatically and control algorithm behavior during runtime all the possible states of the learning progress are calculated in the encoding of the database. For example, for 10 questions (by default), there are $2^{10}$ (1024) possible different sequences of answers (level 0: song A, level 1: song B, level 2: song A, etc).

Figure 12:
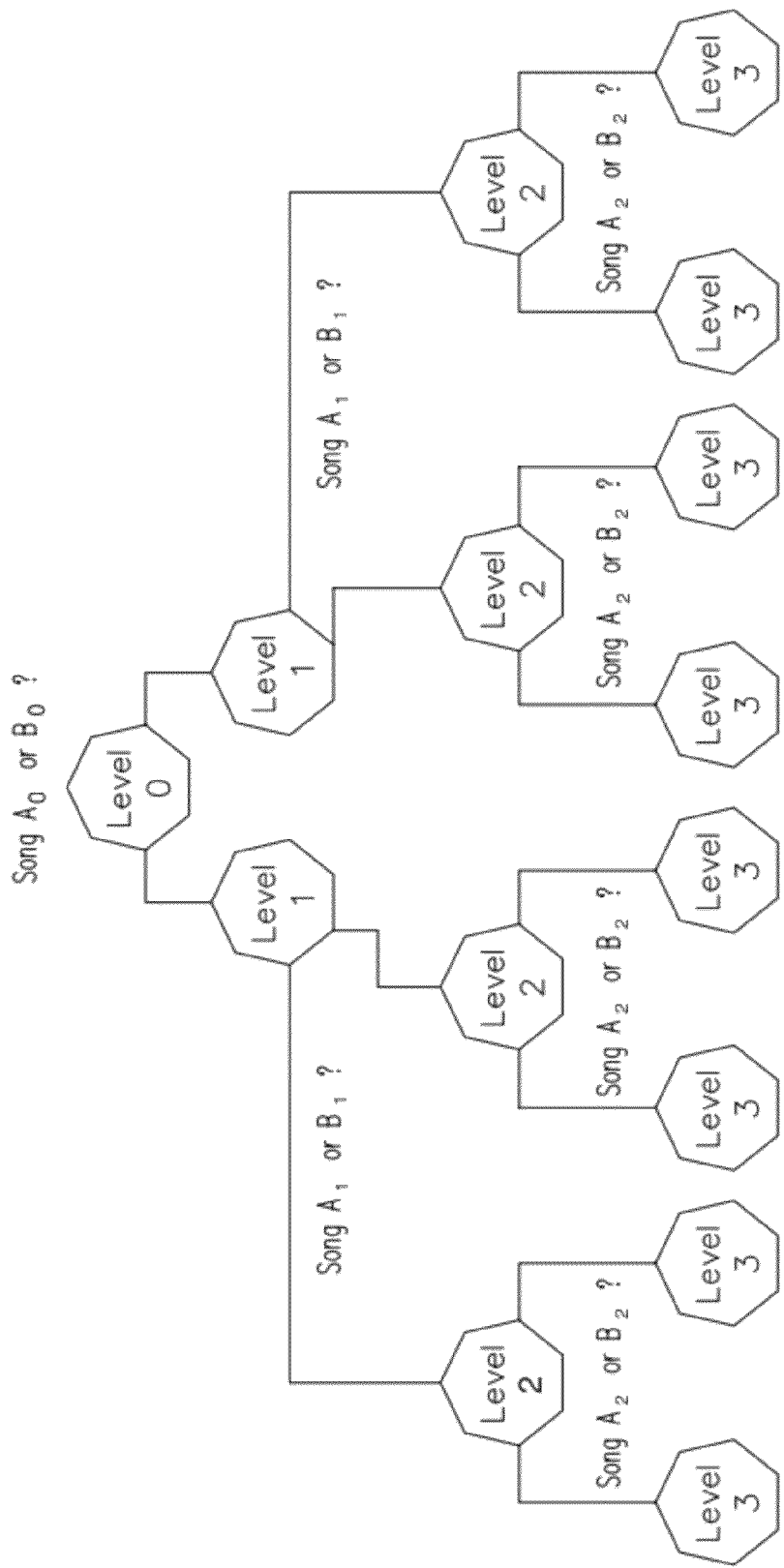
FIG. 12 shows a pre-calculated learning tree for three questions in an example of the present invention.

Referring to FIG. 12, for each node of the learning tree, an ideal analytical pair of songs is created (their kernelized 3D vectors) and using the clusterization described above, pairs of songs are located that are the most similar with the ideal pair of songs. Some "impact" criteria are followed also to avoid repeated questions, so as to increase the diversity of the final learning tree. In runtime, the server only has to keep track of the current node in which the user is, and from the collection of possible pairs of each node, select those that do not contain already used songs. The response time per question has also been divided by 100,000 and it is possible to know beforehand the behavior of the learning tree as simulations can be done introducing a known music taste vector. Finally, the speed of convergence of the algorithm has been reduced intentionally to make the algorithm more robust. For the 2D example, instead of starting with a region that occupies 90° of the quadrant, then after the first question, the region was divided in two to get 45° and so on. In the current release of the algorithm, the region is not divided by 2 in every step, but by an optimal value found experimentally. This allows small estimation errors when the taste vector lies near the axis.

Once the song files have been analyzed and mapped, in the invention we expand the earlier recommendation system described above to a system that uses four layers to provide music recommendation. Those layers have an equivalent metaphor in the human immune system.

$1^{st}$ Layer (Skin): Descriptor Based Recommendation

Figure 13:
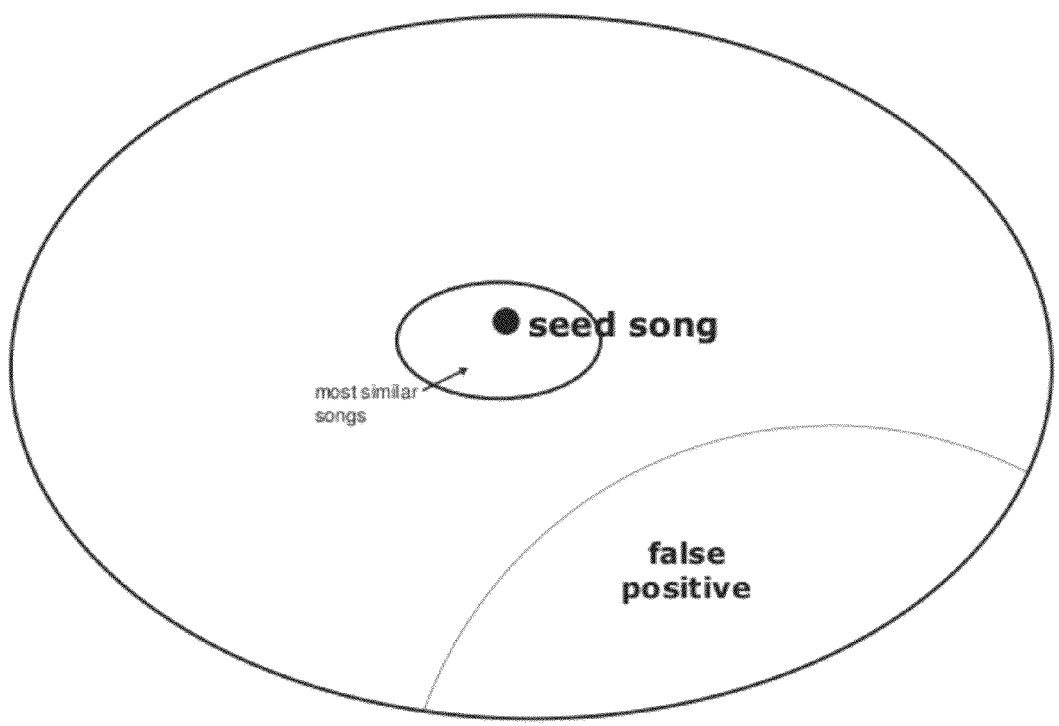
FIG. 13 illustrates a collection of songs using a first layer immune system according to the present invention.

The current implementation extracts a plurality of music descriptors from each analyzed song. Each descriptor is normalized using ADAM non-supervised clustering algorithm. As described above, two similar songs should have less Euclidean distance of their descriptors than two different songs. Given a seed song, a long list of similar songs (several thousands of songs) can be derived using the Euclidean metric. As shown in FIG. 13, this method can be accurate for the most similar songs, but the accuracy of determining similarity decreases as more songs are selected. It is expected then that, in the selected list, there will be several hundred songs similar to the seed song. However, for a given number of selected songs, a certain portion will be so called "false positive". That is, only a portion of a selected song may be similar to the seed song, or the Euclidean distance between the seed song and the selected song is near the selected limit. This method compares all songs in the music universe to a seed song, but the Euclidean calculation can be done efficiently with the intention that the majority of the songs in the database are indicated as not-similar so, in the next layer, the computational burden per song can be increased.

$2^{nd}$ Layer (Medium): Descriptor Based Recommendation

Figure 14:
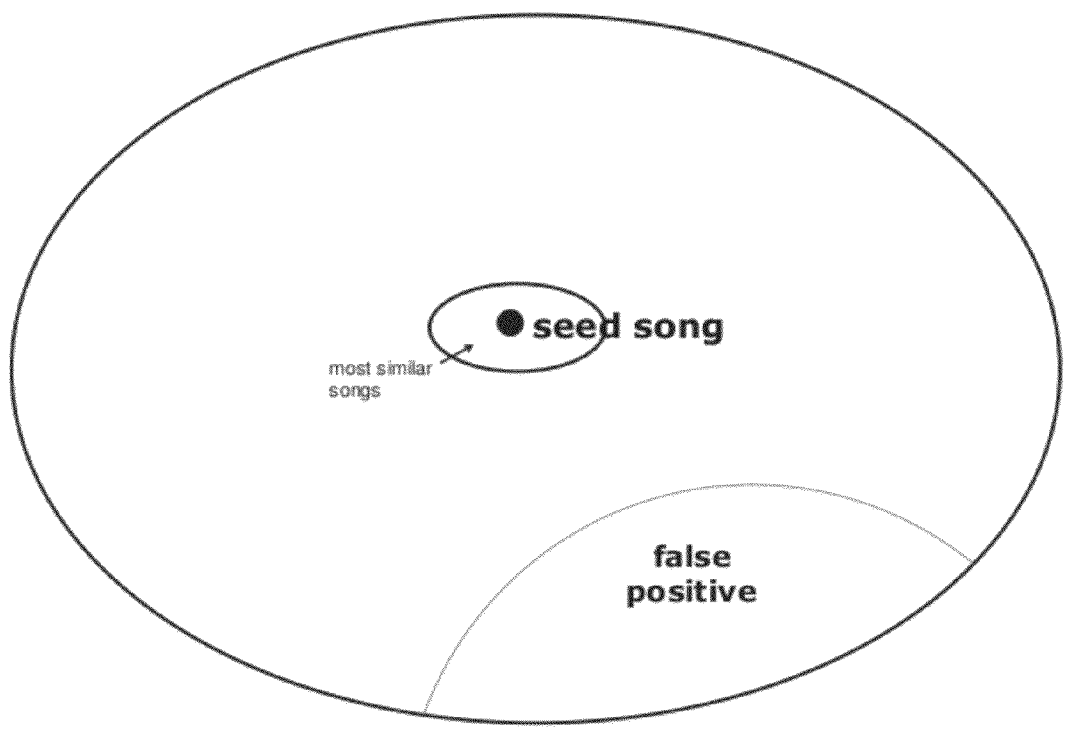
FIG. 14 illustrates a collection of songs using a second layer immune system according to the present invention.

At this stage, the aim is to reduce the list of several thousands of songs to a more usable similar song list with improved accuracy of similarity for all the songs in the reduced list. The core idea is to find the optimal metric between descriptors using a training database of similar and non-similar song pairs. The initial plurality of descriptors has been reduced using principal component analysis at this stage. Initially, the above-described Euclidean criteria is used to select the number of training examples of similar and non-similar song pairs that is used to train the system. Using an iterative method, a Riemann metric learning Algorithm in curve space that minimizes the number of classification errors or "false positives" can be obtained. At this stage, the loop begins searching for the most similar examples, but, instead of using the Euclidean metric, in the next and subsequent passes, we improve the distance metric by employing Bernhardt Riemann curve geometry and distance functions. As shown in FIG. 11, the universe of music is not planar; therefore, a more accurate distance measurement will be along a curved line. The computation is similar to using connected pieces of tangent straight lines to approximate a curve in two dimensions. By using bi-dimensional patches of surfaces in planar form, rather than curved surfaces, we approximate the distance between vector songs with two parameters in the curved surfaces in three dimensions. Hence, the distance between two points (song projections) in the curved space is approximated by the linear Euclidean distance within the small surface patches approximating the surface where they reside. This loop ends when the most similar training pairs do not change after updating the metric or the metric develops a hyperbolic spectrum. Of course, the method is performed in an N dimensional space. The Riemann metric transforms the similarity of two sets of descriptors from two different songs to a scalar value. This method optimizes the calculation of similarity locally in the music universe and provides improved accuracy of good recommendation for the most similar songs in the similar song list and reduces the number of "false positives", as shown in FIG. 14, but, not a single song of the several hundred initially selected in the first layer is discarded.

$3^{rd}$ Layer (Inborn Immune System): Descriptor Based Recommendation

Figure 15:
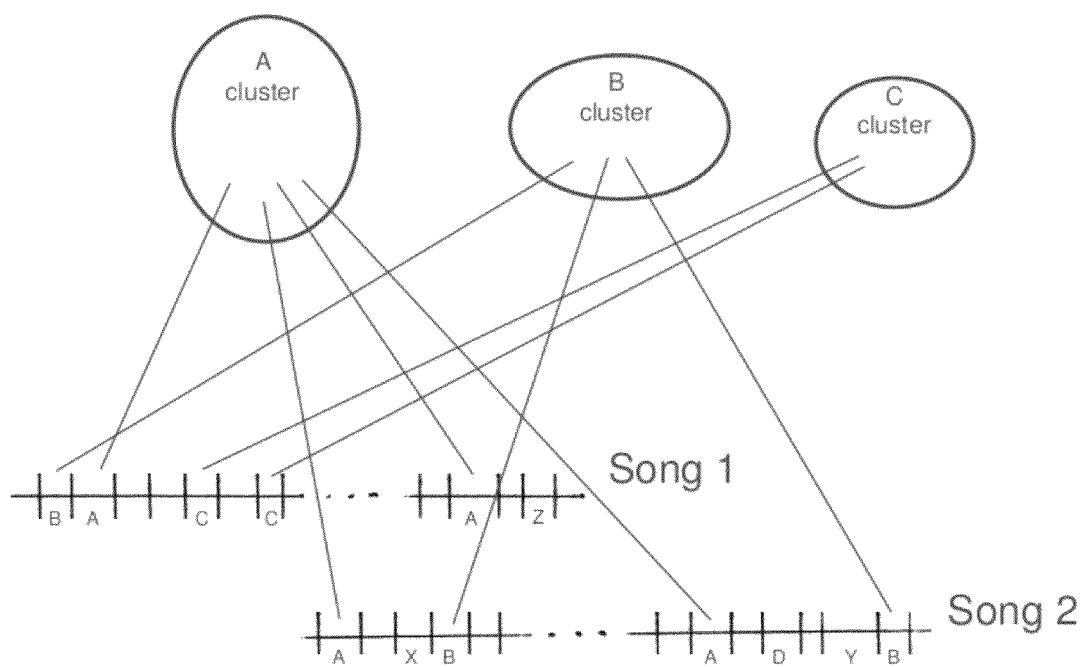
FIG. 15 illustrates songs using millisounds according to the present invention.
Figure 16:
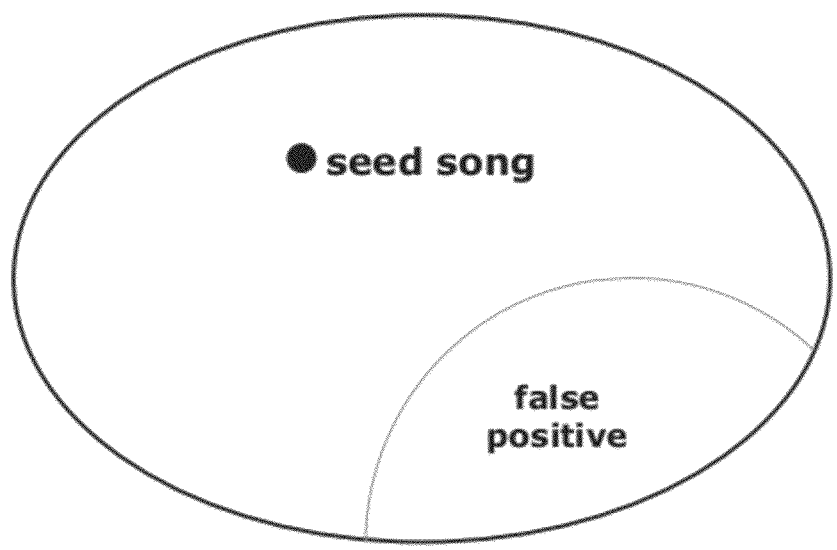
FIG. 16 illustrates a collection of songs using a third layer immune system according to the present invention.

The goal of this layer is to discard songs from the similar songs list sorted in the previous layer. First, the seed song is transcoded to a very low quality format that uses an audio perceptual model to discard insignificant audio data. Then the seed song is divided into millisounds with an innovation detector. A millisound is a segment between 40 and 500 ms that starts with a clear sound/music innovation. The innovation detector uses distances between near autocorrelations to detect changes in music patterns, by isolating abrupt and/or more casual changes in characteristic parameters of the sound signals. Each millisound is characterized by a unique audio-fingerprint based on the results of ADAM clustering over short term perceptual descriptors. FIG. 15 shows an example of songs made up of a series of millisounds. For description purposes, we will indicate the millisounds as A, B, C, D, etc. The process of dividing a song into millisounds is performed for all songs in the music universe. The millisounds provide an audio fingerprint for each song. Then, the above-described acoustic analysis is performed on the millisounds to aggregate similar millisounds in a cluster. Each cluster may contain similar millisounds from several songs. For example, as shown in FIG. 15, the A cluster contains millisounds from Song 1 and Song 2, and may contain millisounds from several more songs. Note, in this example, the C cluster does not contain any millisounds from Song 2. Some millisounds are present in most genres and therefore do not posses any classification power. Only millisounds that are clearly more present in some genres than others are used for classification. It is a probabilistic approach. Hundreds of thousands of songs from all different genres have been analyzed and their millisounds have been clusterized. Each millisound is found in the various genres with a specific probability. To determine song similarity, all millisounds in the seed songs are compared to the selected good classifying millisounds and a seed super-genre probability pattern is obtained. That is, the distinctive millisounds have been associated to a song supergenre. Using the Bernhardt Riemann metric, the distance between clusters is determined as a measure of similarity. FIG. 16 illustrates the set of songs that are similar to the seed song using the descriptor based recommendation. The list of songs is smaller and the portion of "false positives" is also smaller. This same approach can be applied to the several hundred songs on the similar songs list created in the previous layer and those having very different supergenre pattern are allowed to enter to the fourth layer. Only the millisounds that have good super-genre classification (all millisounds in a particular cluster have most of the millisounds in a given supergenre) are stored in the equivalent to the inborn immune system.

$4^{th}$ Layer (Acquired Immune System): Descriptor Based Recommendation

Figure 17:
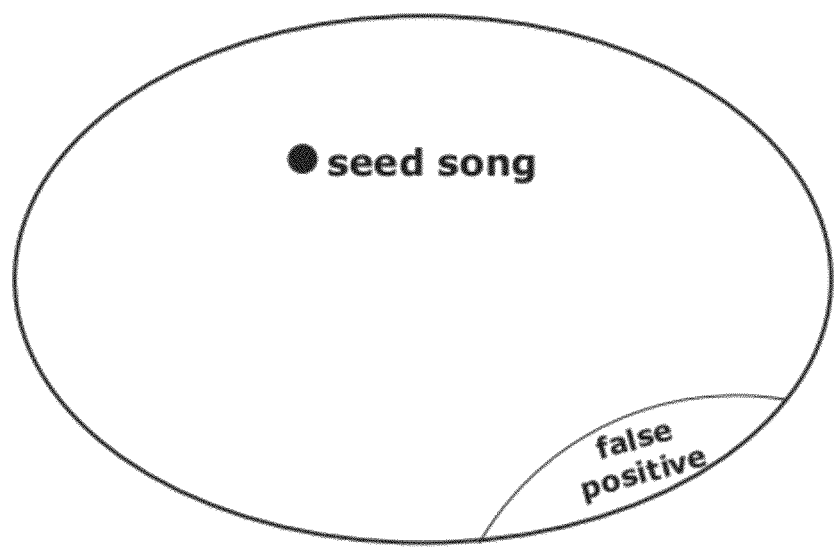
FIG. 17 illustrates a collection of songs using a fourth layer immune system according to the present invention.

Using the same audio-fingerprint for millisounds extracted in the previous layer, the millisounds from the seed song are used to discard similar cluster millisounds in the universe millisound training database. The remaining (non-discarded) millisounds are matched with the remaining songs in the similar song list. Those songs having most millisounds in common with this immune millisound database are discarded from the final list of similar songs presented to a user. FIG. 17 illustrates the set of songs that are similar to the seed song by eliminating the songs having the immune millisounds. Again, the list of songs is smaller and the portion of "false positives" is also smaller.

Using the immunology method described above, users can very quickly and easily browse musically similar songs. In a retail environment, this method can easily be used on in-store terminals, retail websites, MP3 players, or MP3 mobile phone handsets. The same techniques can be used for playlist generation from a personal music collection, or anywhere that similarities between pieces of music can be useful.

The invention has been described with references to preferred embodiments. While specific values, relationships, materials and steps have been set forth for purposes of describing concepts of the invention, it will be appreciated by persons skilled in the art that numerous variations and/or modifications can be made to the invention as shown in the specific embodiments without departing from the spirit or scope of the basic concepts and operating principles of the invention as broadly described. It should be recognized that, in the light of the above teachings, those skilled in the art could modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with the underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present embodiments are to be considered in all respects as illustrative and not restrictive.

What is claimed is:

1. A method of recommending music comprising:
   a) establishing a digital database comprising a plurality of digital song files;
   b) mathematically analyzing each digital song file to determine a numerical value for each of a plurality of selected quantifiable characteristics, wherein each selected quantifiable characteristic is a physical parameter based on human perception;
   c) compiling a song vector comprising a list of numerical values for each of said plurality of selected characteristics for each said digital song file;
   d) extracting a plurality of music descriptors for each song vector;

e) selecting a seed song and comparing the song vector for said seed song to the song vector for each said digital song file by summing the square of the difference between the numerical values of each characteristic in each said song vector based on the music descriptors in step d); and f) deriving a list of songs wherein the sum of the square of the difference between the numerical value of each characteristic based on the music descriptors in each said song vector is below a predetermined threshold.

2. The method according to claim 1, said comparing song vectors comprising evaluating a Euclidean distance between said song vectors.

3. The method according to claim 1, wherein the step of extracting a plurality of music descriptors for each song vector uses Principal Component Analysis in order to minimize the plurality of descriptors vector space cardinality, eliminating correlated dimensions.

4. The method according to claim 1, further comprising the steps of:
   g1) creating, from the list of songs determined in step f), pairs of similar and non-similar songs, wherein similar comprises a small distance according to a Riemann Metric in a curved space of sonic descriptors;
   h1) using an iterative method, which learns the Riemannian Metric, determining pairs of songs having sonic descriptors most similar to the seed song;
   i1) maintaining the pairs of songs in a training database; and
   j1) deriving a list of songs having the least distance in the Riemannian metric in pairs of songs from the seed song.

5. The method according to claim 1, further comprising the steps of:
   g) transcoding each song in the digital database to discard nonsignificant audio data;
   h) dividing each transcoded song into a plurality of millisounds;
   i) characterizing each millisound by a unique audio-fingerprint;
   j) establishing a plurality of song supergenres having similar audio-fingerprints; and
   k) classifying each supergenre wherein the millisounds include most of the music descriptors.

6. The method according to claim 5, further comprising the steps of:
   l) comparing the millisounds from the seed song to selected supergenres wherein the millisounds in the selected supergene include most of the music descriptors to determine a probability of inclusion of the seed song in said selected supergenre, wherein said comparison comprises a clustering algorithm employing the Riemann Metric where the supergenres minimize intradistance and maximize interdistance;
   m) comparing the millisounds from each song in the list created in step f) to the selected supergenres wherein the millisounds in the selected supergene include most of the music descriptors to determine which songs are most different from said selected supergenre according to the Riemann Metric, maintaining songs having sonic descriptors most similar to the seed song in a training database; and
   n) designating those songs that are most different from said selected supergenre as immune songs.

7. The method according to claim 6, further comprising the steps of:
   o) comparing the millisounds from the seed song to the millisounds for the songs in the training database;
   p) discarding from the training database those songs having similar millisounds, wherein similar means a small distance in the Riemann Metric;
   q) comparing the millisounds for songs remaining in the training database with the millisounds for the immune songs; and
   r) discarding from the list generated in step f) those songs having most millisounds in common with the immune songs.

8. The method according to claim 5, said step of dividing each song into a plurality of millisounds further comprising detecting changes in music patterns by isolating changes in characteristic parameters of the sound signal.

9. A computer implemented method of determining a user's preference of music, comprising the steps of:
   providing a digital database comprising a plurality of digital song files;
   providing an analysis engine having software for use in a computer processor adapted to execute said software;
   using said computer processor to analyze each digital song file to determine a numerical value for each of a plurality of quantifiable characteristics, wherein each quantifiable characteristic is a physical parameter based on human perception;
   using said computer processor to create a multidimensional song vector for each digital song file, said multidimensional song vector representing numerical values for each of said quantifiable characteristics;
   using said computer processor to extract a plurality of music descriptors for each song vector;
   selecting a seed song and using said computer processor to compare the song vector for said seed song to the song vector for each song file by summing the square of the difference between the numerical values of each characteristic in each said song vector based on the music descriptors; and
   using said computer processor to derive a first list of songs wherein the sum of the square of the difference between the numerical value of each characteristic based on the music descriptors in each said song vector is below a predetermined threshold.

10. The method according to claim 9, said using said computer processor to compare song vectors further comprising evaluating a Euclidean distance between said song vectors.

11. The method according to claim 9, wherein the step of using said computer processor extracting a plurality of music descriptors for each song vector further comprises said computer processor using Principal Component Analysis in order to minimize the plurality of descriptors vector space cardinality, eliminating correlated dimensions.

12. The method according to claim 9, further comprising the steps of:
   said computer processor creating, from the list of songs, pairs of similar and non-similar songs, wherein similar comprises a small distance according to a Riemann Metric in a curved space of sonic descriptors;
   said computer processor, using an iterative method which learns the Riemannian Metric, determining the pairs of songs having sonic descriptors most similar to the seed song;
   storing an identification for the pairs of songs in a training database; and
   using said computer processor to derive a list of songs having the least distance in the Riemannian metric in pairs of songs from the seed song.

13. The method according to claim 9, further comprising the steps of:
- using said computer processor to transcode each song in the digital database in order to discard nonsignificant audio data;
- said computer processor dividing each transcoded song into a plurality of millisounds;
- using said computer processor to establish a plurality of song supergenres having similar audio-fingerprints; and
- classifying each supergenre wherein the millisounds include most of the music descriptors.

14. The method according to claim 13, further comprising the steps of:
- said computer processor comparing the millisounds from the seed song to selected supergenres wherein the millisounds in the selected supergene include most of the music descriptors to determine a probability of inclusion of the seed song in said selected supergenre, wherein said comparison comprises a clustering algorithm employing the Riemann Metric where the supergenres minimize intradistance and maximize interdistance, maintaining songs having sonic descriptors most similar to the seed song in a training database;
- said computer processor comparing the millisounds from each song in the first list of songs to the selected supergenres wherein the millisounds in the selected supergene include most of the music descriptors to determine which songs are most different from said selected supergenre according to the Riemann Metric; and
- designating those songs that are most different from said selected supergenre as immune songs.

15. The method according to claim 14, further comprising the steps of:
- said computer processor comparing the millisounds from the seed song to the millisounds for the songs in the training database;
- said computer processor discarding from the training database those songs having similar millisounds, wherein similar means a small distance in the Riemann Metric;
- said computer processor comparing the millisounds for songs remaining in the training database with the millisounds for the immune songs; and
- discarding from the first list of songs those songs having most millisounds in common with the immune songs.

16. The method according to claim 13, said step of dividing each song into a plurality of millisounds further comprising detecting changes in music patterns by isolating changes in characteristic parameters of the sound signal.

* * * * *